United States Patent
Sunay et al.

(10) Patent No.: US 10,548,027 B2
(45) Date of Patent: Jan. 28, 2020

(54) SYSTEM AND APPARATUS FOR PROGRAMMABLE VIRTUALIZATION AND OPTIMIZATION OF AGGREGATED WIRELESS RADIO ACCESS TECHNOLOGIES

(71) Applicant: NETSIA, INC., Sunnyvale, CA (US)

(72) Inventors: Mehmet Oguz Sunay, San Francisco, CA (US); Ali Ozer Ercan, San Jose, CA (US)

(73) Assignee: NETSIA, INC., Sunnyvale, CA (US)

( * ) Notice: Subject to any disclaimer, the term of this patent is extended or adjusted under 35 U.S.C. 154(b) by 100 days.

(21) Appl. No.: 15/849,635

(22) Filed: Dec. 20, 2017

(65) Prior Publication Data

US 2018/0176800 A1  Jun. 21, 2018

Related U.S. Application Data

(60) Provisional application No. 62/436,624, filed on Dec. 20, 2016.

(51) Int. Cl.
| | |
|---|---|
| *H04W 76/00* | (2018.01) |
| *H04W 24/02* | (2009.01) |
| *H04W 72/04* | (2009.01) |
| *H04W 88/06* | (2009.01) |

(52) U.S. Cl.
CPC .......... *H04W 24/02* (2013.01); *H04W 72/04* (2013.01); *H04W 88/06* (2013.01)

(58) Field of Classification Search
CPC ..... H04W 88/06; H04W 76/15; H04W 48/06; H04W 4/70; H04W 84/12; H04W 88/16; H04W 28/085; H04W 72/0486; H04W 76/27; H04W 88/08
See application file for complete search history.

(56) References Cited

U.S. PATENT DOCUMENTS

| | | |
|---|---|---|
| 9,119,154 B2 | 8/2015 | Etemad et al. |
| 9,294,926 B2 | 3/2016 | Pragada et al. |
| 9,295,092 B2 | 3/2016 | Kaur et al. |
| 2014/0050086 A1 | 2/2014 | Himayat et al. |
| 2014/0133456 A1 | 5/2014 | Donepudi et al. |
| 2014/0369329 A1 | 12/2014 | Lee et al. |

(Continued)

OTHER PUBLICATIONS

B. Fan et al., "A Generic Framework for Heterogeneous Wireless Network Virtualization: Virtual MAC Design," IEEE Wireless Communications and Networking Conference 2016, Apr. 3, 2016, 5pgs.

(Continued)

*Primary Examiner* — Sai Aung
(74) *Attorney, Agent, or Firm* — IP Authority, LLC; Ramraj Soundararajan

(57) ABSTRACT

User equipments (UEs) that have multiple radio access technologies (RATs) are grouped together so that each group may be subjected to its own set of medium access (MAC) protocols for each RAT, while a flow destined for a UE may be communicated via one or multiple aggregated RAT interfaces on the said UE. The network operator or service provider that serves a plurality of subscribers defines a service group for said plurality of subscribers and controls the corresponding virtualized MACs for the said service group.

13 Claims, 7 Drawing Sheets

(56) References Cited

U.S. PATENT DOCUMENTS

| | | | |
|---|---|---|---|
| 2015/0049707 A1* | 2/2015 | Vajapeyam | H04W 24/10 |
| | | | 370/329 |
| 2015/0117357 A1 | 4/2015 | Ozturk et al. | |
| 2015/0189551 A1* | 7/2015 | Ozturk | H04W 28/08 |
| | | | 370/235 |
| 2015/0334724 A1 | 11/2015 | Faccin et al. | |
| 2015/0350954 A1 | 12/2015 | Faccin et al. | |
| 2015/0350988 A1* | 12/2015 | Himayat | H04W 36/22 |
| | | | 370/331 |
| 2016/0212755 A1 | 7/2016 | Cao et al. | |
| 2017/0078890 A1* | 3/2017 | Zhu | H04W 16/14 |
| 2017/0118793 A1* | 4/2017 | Liu | H04W 72/0446 |
| 2017/0171903 A1* | 6/2017 | Kubota | H04L 41/0672 |
| 2018/0352477 A1* | 12/2018 | Singh | H04W 28/085 |
| 2018/0376366 A1* | 12/2018 | Singh | H04W 24/10 |

OTHER PUBLICATIONS

M. Derakhshani et al., "Leveraging Synergy of 5G SDWN and Multi-Layer Resource Management for Network Optimization," arxiv.org, Cornell University Library, Feb. 26, 2016, 11pgs.

* cited by examiner

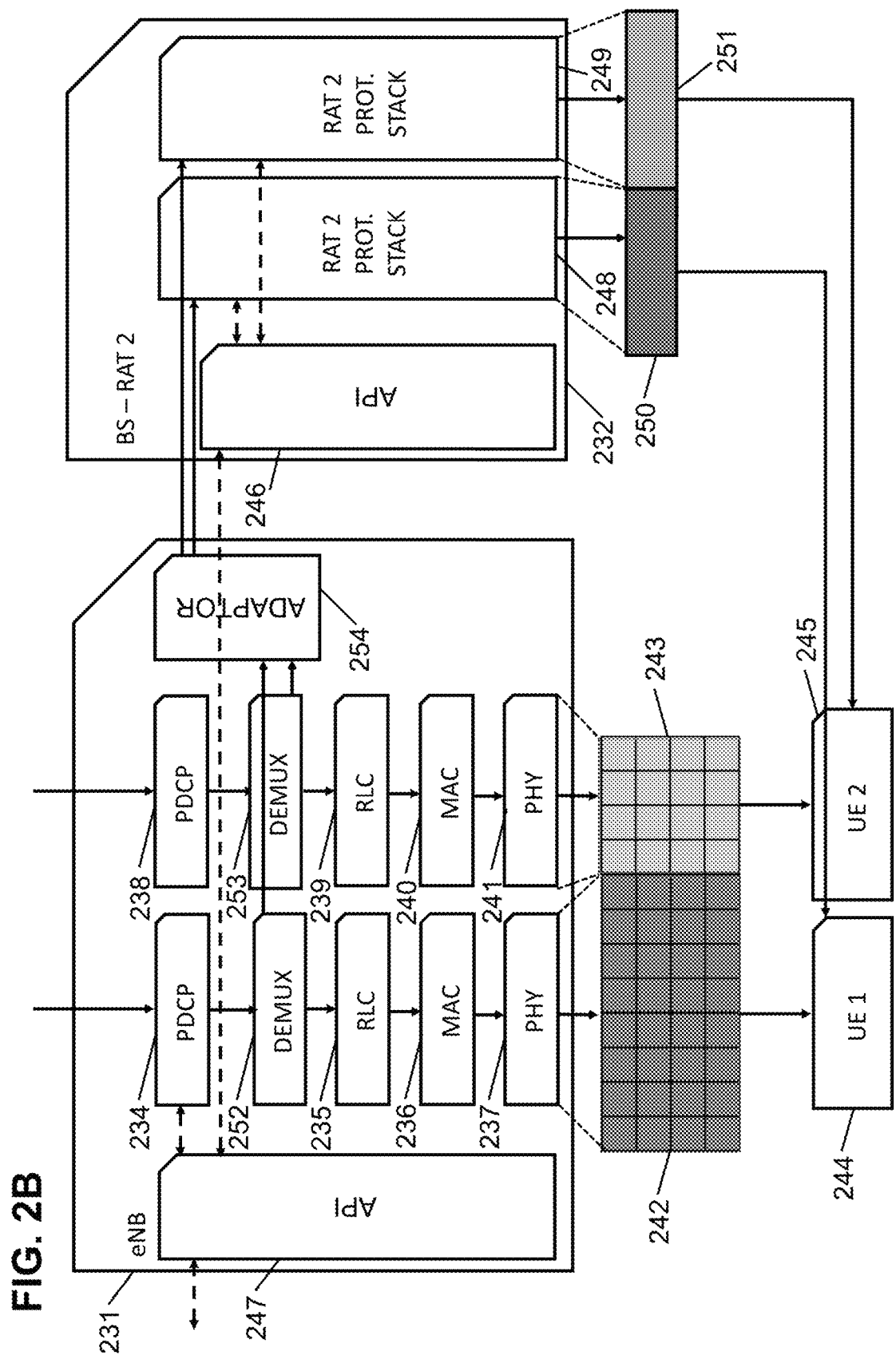

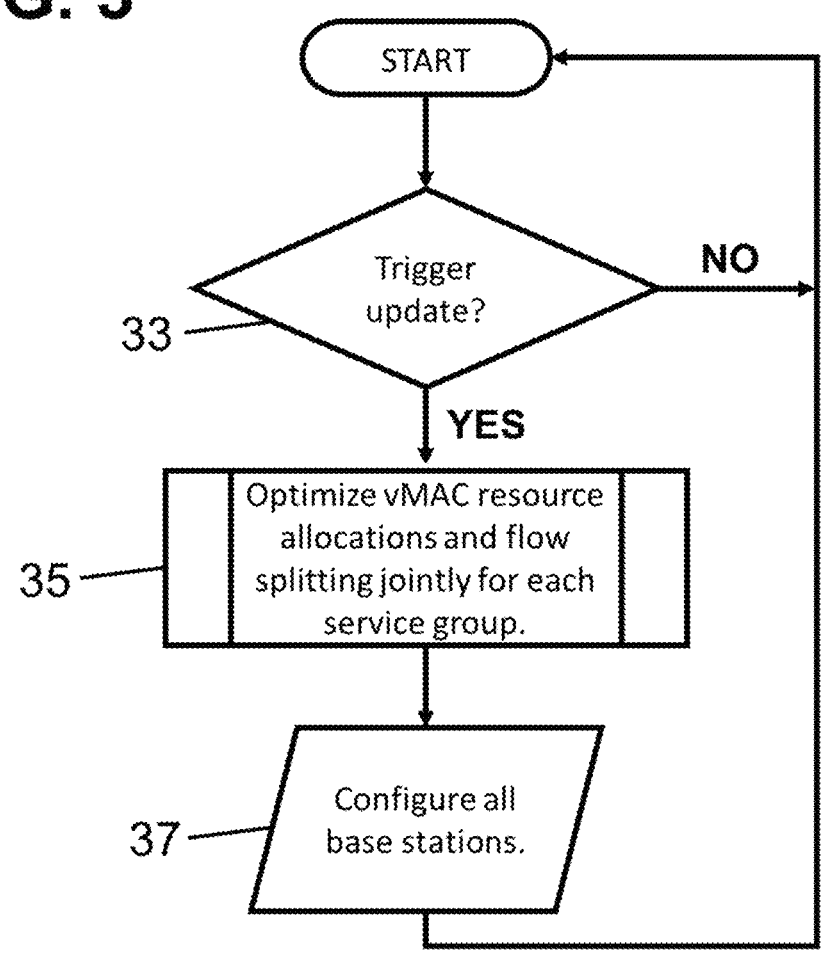

SYSTEM AND APPARATUS FOR PROGRAMMABLE VIRTUALIZATION AND OPTIMIZATION OF AGGREGATED WIRELESS RADIO ACCESS TECHNOLOGIES

RELATED APPLICATION

This application claims the benefit of provisional application 62/436,624 filed Dec. 20, 2016.

BACKGROUND OF THE INVENTION

Field of Invention

The present application pertains to architectures and methods for optimal programmable link aggregation in programmatically virtualizable radio access networks utilizing multiple radio access technologies.

Discussion of Related Art

A number of related art is present. The patent specification U.S. Pat. No. 9,294,926 B2 presents a method and apparatus for integrating 3GPP and IEEE 802.11 radio access technologies. Architectures for integrating these interfaces at the MAC layer or below the MAC layer are specified. New interfaces between the 802.11 access point (AP) and another AP, eNB and AP are defined. Signaling for various operations such as measurement reporting, mobility, etc. are specified. A session management entity is described for the coordination of the 3GPP radio resource control entity and 802.11 MAC.

The patent application US 2015/0117357 A1 describes a packet convergence layer that communicates with two radio access technology (RAT) links and monitor the sequence number of the packets coming from both RATs. The convergence layer may deliver the packets to higher layers as they are received, i.e., out of order, or it may reorder them before delivering but ignore the lost packets, or it may request for retransmissions of the lost packets.

The patent application US 2014/0369329 A1 specify techniques for the aggregation of LTE and WiFi radio access technologies, that select the LTE, WiFi or both interfaces for the transmission of data packets to a user equipment. Selection criteria such as link qualities, link loads, backhaul loads, etc. are suggested.

The patent specification U.S. Pat. No. 9,295,092 B2 specifies a middleware convergence layer above the MAC layers of different radio access technologies. Using the information received from the MAC layers, the convergence layer selects the most appropriate downlink and uplink radio access technologies to match service requirements.

The patent specification U.S. Pat. No. 9,119,154 B2 specifies architectures and procedures for the integration of WWAN (such as LTE or WiMAX) and WLAN (such as Wi-Fi or Bluetooth) radio access technologies where WWAN is regarded as the primary cell and WLAN is regarded as the secondary cell. A multi-RAT aggregation and coordination module is specified within the radio resource control unit of the primary radio that coordinates the use of secondary radio at the unlicensed spectrum for data transfer. In a similar setup, the patent application US 2014/0050086 A1 specify system and methods for offloading traffic from WWAN to WLAN at the IP, PDCP, RLC or MAC layers managed by a radio resource controller (RRC) or a MAC scheduler with RRC control.

The patent application US 2015/0350954 A1 specifies methods, apparatus and architectures for routing data bearers, when the user equipment is associated with the base station of the first radio access technology and served by the base station of a second radio access technology.

The patent application US 2015/0334724 A1 specifies techniques for managing wireless network connections for traffic aggregation, where, a device that is connected to two radio access technologies and the second connection is configured to implement traffic aggregation first connection based on the configuration from the first access point and manage the aggregation. Procedures for the management of link aggregation, such as prioritization of links using policies are described.

The patent application US 2014/0133456 A1 specifies systems and methods for the dynamic virtualization of multi-access wireless networks where a heterogeneous mesh network of multiple RATs are connected to a cloud component, which appears to all radio access technologies as a single virtual base station. Paging and handover strategies are presented.

Embodiments of the present invention are an improvement over prior art systems and methods.

SUMMARY OF THE INVENTION

In one embodiment, the present invention provides a system for programmable virtualization and joint optimization of wireless link aggregation comprising: a plurality of user equipment (UE), each UE having a plurality of unique radio access technologies (RAT) interfaces, each unique RAT interface associated with a unique RAT technology and each unique RAT interface served by a corresponding base station (BS); a RAN controller performs network virtualization by invoking, configuring, and controlling parameters of virtual MACs (vMACs) for each service group at all RAT BSs; wherein for each service group, the RAN controller performs joint optimization of vMAC configurations for wireless resources allocated to each vMAC and data flow splitting between the plurality of RAT interfaces of each UE.

In another embodiment, the present invention provides a system for programmable virtualization and joint optimization of wireless link aggregation comprising: a plurality of user equipment (UE), each UE having n unique radio access technology (RAT) interfaces, where n is greater than 2, each unique RAT interface associated with a unique RAT technology and each unique RAT interface served by a corresponding base station (BS); a RAN controller performs network virtualization by invoking, configuring, and controlling parameters of virtual MACs (vMACs) for each service group at all RAT BSs; wherein for each service group, the RAN controller performs joint optimization of vMAC configurations for wireless resources allocated to each vMAC and data flow splitting between the plurality of RAT interfaces of each UE, and wherein the RAN controller performs the joint optimization for the n RATs, where a first base station (BS) associated with the first RAT interface splits incoming traffic into n flows and forwards (n−1) flows to remaining (n−1) RAT interfaces, and where received n flows are merged into one flow at a destination UE.

BRIEF DESCRIPTION OF THE DRAWINGS

The present disclosure, in accordance with one or more various examples, is described in detail with reference to the following figures. The drawings are provided for purposes of illustration only and merely depict examples of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

FIG. 2A and FIG. 2B show the system architecture and methods for joint virtualization and aggregation of two RATs.

FIG. 3 describes the optimization process that is performed by the RAN controller.

FIG. 4A shows one embodiment when the percentage of wireless resources allocated to each service group at one RAT are specified by the service group attributes, and FIG. 4B shows another embodiment when the percentage of wireless resources allocated to each service group at both RATS are specified by the service group attributes.

DESCRIPTION OF THE PREFERRED EMBODIMENTS

Figure 1:
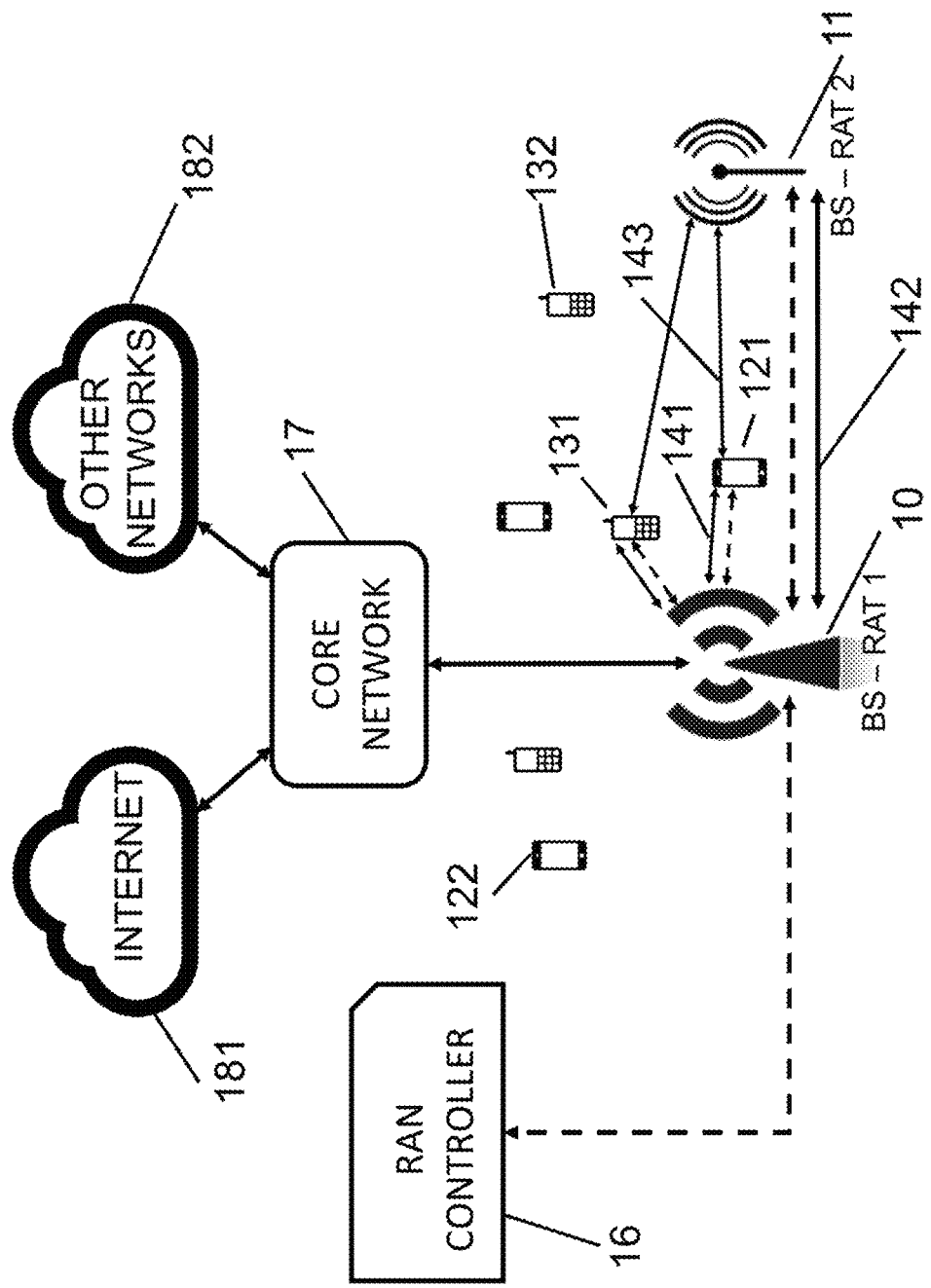
FIG. 1 shows the architecture assumed by the invention.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein.

With the recent trends in wireless telecommunications, mobile data demand has grown exponentially. In addition, heterogeneity in mobile networks has thrived in the QoS requirements, data rates, device types, cell sizes and radio access technologies. Both trends necessitate efficient use of wireless spectrum and disruptive ways to manage radio resources. Fueled by these requirements and recent proliferation of smart mobile devices with multiple interfaces with different radio access technologies (RATs) with overlapping service areas, aggregation of these RATS has recently become attractive. In 2015, for the first time, more than half of the mobile data traffic was offloaded to Wi-Fi access points or femtocells. LTE-WLAN aggregation (LWA) and LTE WLAN radio level integration with IPsec tunnel (LWIP) are recently defined in 3GPP Release 13.

The present invention considers a wireless network where user equipments (UEs) that have multiple radio access technologies (RATs) are grouped together so that each group may be subjected to its own set of medium access (MAC) protocols for each RAT, while a flow destined for a UE may be communicated via one or multiple aggregated RAT interfaces on the said UE. The network operator or service provider that serves a plurality of subscribers defines a service group for said plurality of subscribers and controls the corresponding virtualized MACs for the said service group. The grouping of users or flows of users into service groups may be in one or more of the following ways:

In an environment where one mobile network operator (MNO) and one of more mobile virtual network operators (MVNOs) utilize the same spectrum, users may be grouped according to their network operator subscriptions, Users may be grouped according to their service subscription profiles, Users may be grouped according to their geography and time specific radio resource reservation requests, Flows of users may be grouped according to flow profiles where a flow profile includes but is not limited to the following: flow type, flow header contents, over-the-top service provider identity.

According to the invention, virtual medium access control layers (vMACs) for all existing service groups and for all radio access technologies may be programmatically invoked, modified or terminated on each base station at a given time. Each vMAC at a RAT's BS may be allocated a portion of the available wireless resources and may run its own scheduler which is responsible from deciding which of its allocated subscriber flows are to be served on its allocated portion of the wireless resources. If for some RATs, wireless resources may not be isolated between vMACs, other configurations that are specific to said RAT, such as rate limitations, QoS parameters, etc., may be assigned separately for the corresponding vMAC in a programmable manner. For each service group, a RAN controller jointly calculates the optimal vMAC configuration (such as the optimal allocation of resources to each RAT's vMAC) and optimal splitting of flows to different RATs using service group attributes, the properties of the subscriber flows, and the collected information from the BSs and the UEs.

A number of related art to the presented invention are summarized above. Most of these art focus on architectures and methods to aggregate multiple RATs and do not consider virtualization of RATs. The patent application US 2014/0133456 A1 aims to virtualize multiple RAT interfaces present in a heterogeneous mesh network, such that all nodes in the network are presented with an API as if they are connected to a single base station in the cloud. The purpose of the presented invention is quite the opposite from this patent application. The presented invention uses virtualization to allocate and isolate wireless resources for different service groups and provide each group with their own MAC layer, as if each service group is operating independently under a virtualized base station. Furthermore, the disclosed invention presents architectures and methods to aggregate multiple virtualized RATS, such that a jointly optimal resource allocation and flow splitting can be reached between service groups and serving RATs.

The wireless network architecture assumed by the invention is depicted in FIG. 1. Plurality of user equipments (UEs) have multiple interfaces for multiple radio access technologies (RAT). Each RAT interface is served by its corresponding base station. Furthermore, there may exist different service groups that the said UEs belong to. For each service group, the RAN controller jointly optimizes the vMAC configurations, such as the wireless resources allocated to each aggregated RAT's vMAC, and the data splitting between the RATs. The RAN controller configures both the virtual MACs at both base stations according to optimal vMAC settings, as well as the RAT 1 BS to use the optimal splitting and forward part of the flow through RAT 2 BS.

Particularly, in FIG. 1, plurality of user equipments (UE) such as (121), (122), (131), (132) have multiple interfaces for multiple radio access technologies (RAT). Each RAT interface is served by its corresponding base station (10), (11). There may exist different service groups that the said UEs belong to. In the figure, as an example, UEs belonging to two service groups, which are depicted by using different icons for the UEs, connect via two RAT interfaces to corresponding base stations (BS) depicted using two different BS icons (10), (11). In the figure, the UEs (121), (122) belong to one service group and (131), (132) belong to another service group. It may also be the case that a UE may belong to more than one service group, or a UE may belong to different service groups at different times or locations. On the other hand, there may not be any distinction of the UEs based on the service groups, which is equivalent to all UEs belonging to the same service group. Thus, the invention's service group definition covers all of these cases.

The RAN controller (16) has access to the service group attributes. The collection of attributes for a service group is called "group profile," and may consist of properties such as, and not limited to, the user equipments and base stations for which the profile is defined for, the RAN control algorithms (e.g., admission control, scheduling, handover, etc.) used for said service group, percentage of wireless resources allocated to said service group, downlink and uplink data rate limits assigned to said service group, etc. The RAN controller performs network virtualization, i.e., invokes, configures and controls the parameters of virtual MACs for each service group at all RAT BSs.

The invention specifies system and methods for programmable virtualization and joint optimization of wireless link aggregation. In FIG. 1, the solid lines denote the data communications between different entities and the dashed lines denote the control signaling. The link aggregation is performed in the downlink. The uplink traffic is assumed to use RAT 1 only. A data flow from the internet (181) or other networks (182) goes through the core network of RAT 1 (17). An example for such an entity can be the EPC if RAT 1 is LTE, however the invention is not limited to any standard, and is also applicable to any similar architecture of future standards. From the core network, the flow arrives at the BS (10). The RAN controller configures both base stations to forward part of the flow through RAT 2 BS to the UEs (142), (143), while the rest is directly transmitted to the UEs through RAT 1 BS (141). The RAN controller also configures the UEs for combining the two simultaneous streams received from RAT 1 and RAT 2 BSs back into a single stream. The RAN controller also periodically collects information from both BSs and UEs such as link qualities, signal strength/quality indicators, instantaneous traffic loads and rates, etc., in order to be able to perform optimization. All of these configurations and information collection are part of the control communications, done via the dashed connections in FIG. 1.

In the preferred embodiment, for each service group, the RAN controller jointly optimizes the vMAC configurations, such as the wireless resources allocated to each aggregated RAT's vMAC, and the data splitting between the RATs. The RAN controller configures both the virtual MACs at both base stations according to optimal vMAC settings, as well as the RAT 1 BS (10) to use the optimal splitting and forward part of the flow through RAT 2 BS (11).

In another embodiment, the number of aggregated access technologies may be more than two. In this case the RAN controller does the optimization for n RATs, where n is the number of aggregated radio access technologies. As a result of this optimization, the RAT 1 BS splits the incoming traffic into n flows and forwards n−1 flows to remaining n−1 RATs. Then all received n flows are merged into one flow at the UE. For the sake of illustration, two RATs are shown to be aggregated in this patent, however the architecture is applicable to any number of RATs. When network virtualization is performed, a separate data stack per network slice is formed in each RAT's BS.

In one embodiment, the RAT 1 may be LTE and RAT 2 may be belonging to the IEEE 802.11 family (Wi-Fi). In this case, as detailed in the 3GPP Release 13, two ways of aggregating LTE and Wi-Fi links are as follows. When packets for a flow arrive at the LTE eNB, before the PDCP layer, some packets may be sent as IP packets via IPsec tunneling to the second RAT's AP (e.g., Wi-Fi AP) to be delivered to the UE that the said flow is destined to. This case is called LWIP. Alternatively, some packets of the flow can be sent to the second RAT after the PDCP layer before the RLC layer. This is called LWA. In this case, the PDCP packets are encapsulated into IP packets which carry bearer identity, using an adaptation layer (LWAAP). At the UE, the received packets of the flow from two RATs are combined into a single flow.

This invention is applicable to LWA and LWIP technologies but not limited to them. More importantly, disclosed invention's novelty is complementary to LWA, LWIP or any other existing art on link aggregation. For the sake of clarity, the special case of RAT 1 being LTE is going to be used to illustrate the disclosed methods. However, the methods are applicable to any RATs and any number of RATs.

Figure 2A:
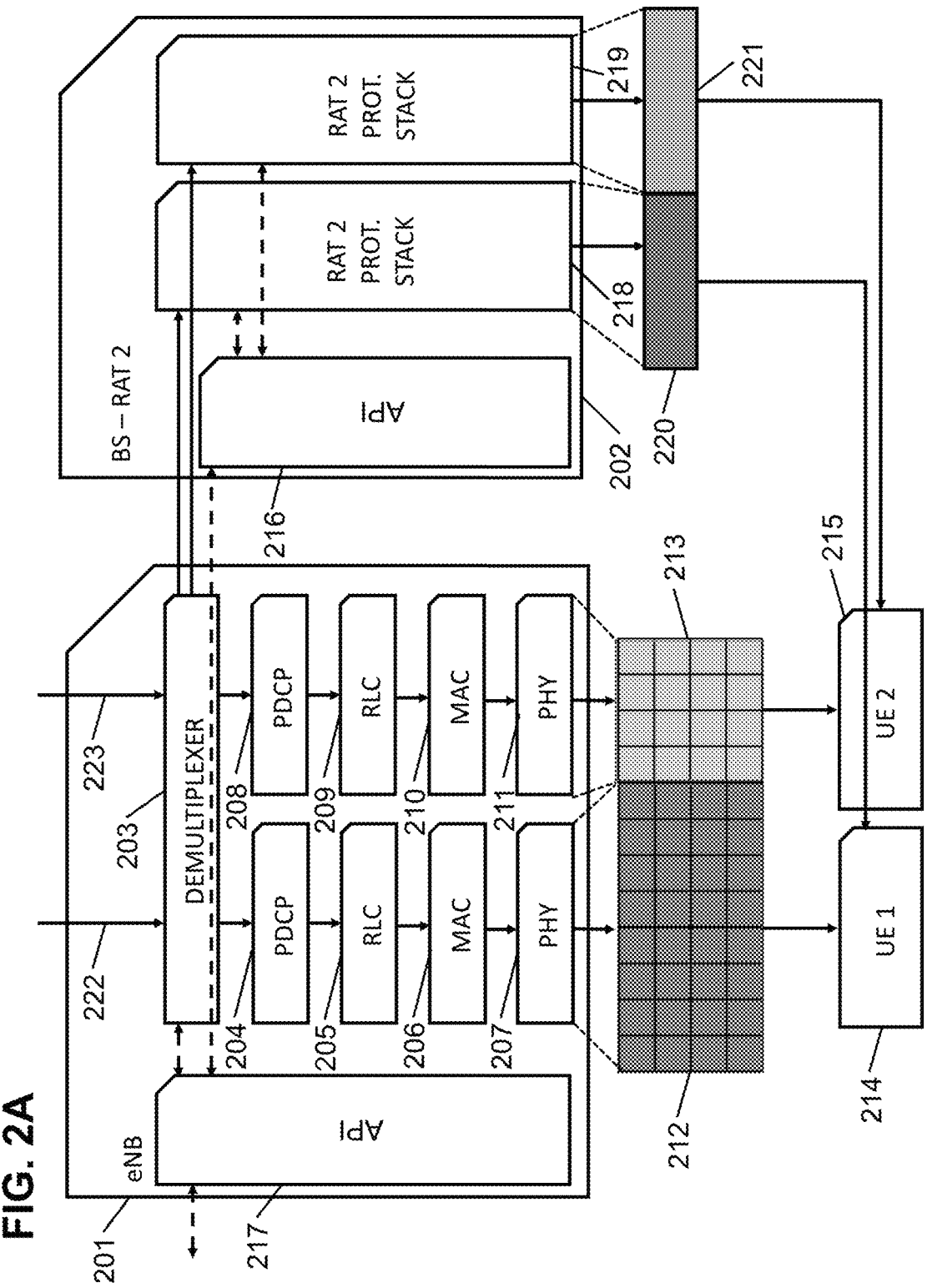

FIG. 2A and FIG. 2B show the system architecture and methods for joint virtualization and aggregation of two RATs. For the sake of illustration, RAT 1 is assumed to be LTE, however, the disclosure is not limited by this and is applicable to any RATs. Also for the sake of illustration, the cases when the split of the data flows before or after the PDCP layer in the LTE protocol—similar to LWIP and LWA cases, respectively—are given in FIG. 2A and FIG. 2B, respectively. The disclosure is not limited to these two cases, and applicable to any other level of splitting. In FIG. 2A, the case when the split of the flows is performed before the PDCP layers of each vMAC is shown. In FIG. 2B, the case when the split of the flows is performed after the PDCP layers and before the RLC layers of each vMAC is shown.

In FIG. 2A, for illustration, two service groups are assumed to exist. UE 1 (214) is assumed to belong to the first service group and UE 2 (215) is assumed to belong to the second service group. The flows (222) and (223) are assumed to be destined to UE 1 and UE 2, respectively. As such, the RAN controller invokes and configures two separate protocol stacks at RAT 1 BS for the two flows. The layers (204), (205), (206) and (207) serve to one service group and the layers (208), (209), (210) and (211) serve to another service group. The RAN controller also slices the radio resource blocks to the service groups. The resource blocks in darker shade (212) are allocated to one service group and the ones in lighter shade (213) are allocated to another service group. The control communications and the execution of the vMAC invocation, resource allocation, etc., are performed by the RAN controller with the help of an API layer (217).

Using the service group attributes (priority, equipment capabilities, used RAN control algorithms, etc.), and the collected information from the BSs and the UEs (link qualities, signal strengths, instantaneous and/or expected loads, rates, etc.), the RAN controller jointly optimizes for the following:

1. The optimal resource allocation for each service group in RAT 1
2. The optimal resource allocation and/or other relevant vMAC properties for each service group in RAT 2
3. The optimal way of splitting the data between RAT 1 and RAT 2.

In the preferred embodiment, the optimization is done and the results are applied periodically as values such as link qualities, BS loads, etc., change over time. The optimization may have many goals such as efficient use of wireless resources, maximizing user utility, load balancing, etc., and combinations thereof. For example, in one embodiment RAT 1 can be the LTE interface and RAT 2 can be the 802.11 (Wi-Fi) interface. In this setting, service groups characterized by non-time critical flows such as file download may be off-loaded completely to the Wi-Fi network to use the LTE network for service groups that request low latency. Furthermore, the flows of lower priority service groups may be resource- or rate-limited on the Wi-Fi network in favor of higher priority service groups. The RAN controller configures a demultiplexer functionality in RAT 1 BS (201) to send part of each flow to RAT 2 BS (202), according to the optimization results. In FIG. 2A, the splitting of the flows is done before the PDCP layer, thus, IP packets are sent to RAT 2 BS. They may be sent via an IPSec tunnel as in LWIP technology, or via any other IP based connection.

Via the API in RAT 1 BS (217), the RAN controller instructs an API layer in RAT 2 BS (216) to also invoke and configure separate protocol stacks for each service group (218), (219), according to the optimization results. As in RAT 1, the configuration is updated periodically as new optimizations are done. Depending on the capabilities of RAT 2, virtualization configurations for each protocol stack can be applied, such that wireless resources are allocated to service groups. The wireless resources can be any combination of time, frequency, code, antenna, etc. For some RATs, the resource allocation may be done in an indirect way. For example, Wi-Fi uses a random access technology, therefore, the control of wireless resources is not completely in the hands of the Wi-Fi base station. However, using functionalities such as iptables, queuing disciplines, etc., Wi-Fi base stations can be configured to limit maximum rate of and/or allocate maximum percentage of available throughput to a given service group or flow. This is illustrated with the gray boxes (220), (221).

In FIG. 2B, the split of the flows is performed after the PDCP layers (234), (238). Therefore, the PDCP packets are encapsulated by an adaptor functionality (254) into IP packets before sending them to the RAT 2 BS (232). The adaptor block can be similar to the LWAAP block in the LWA technology, as such, the encapsulated IP packets may also carry LTE bearer information.

FIG. 3 describes the optimization process that is performed by the RAN controller. The RAN controller periodically optimizes for resource allocations to each vMAC at all base stations using service group attributes and information from both BSs and UEs such as link qualities, signal strength/quality indicators, instantaneous and expected base station loads, flow rates, etc. Then the RAN controller configures all RAT base stations with the optimal configurations. The RAN controller periodically collects information from both BSs and UEs such as link qualities, signal strength/quality indicators, instantaneous and expected base station loads, flow rates, etc. Any changes in these metrics that necessitate an update triggers a new optimization (33). A new optimization is also triggered whenever a new service group is formed or whenever a change in the service group attribute happens. When triggered, the RAN controller optimizes all vMAC resource allocations and flow splitting configurations for all service groups and for all radio access technologies jointly (35). Then the RAN controller configures all RAT base stations with the optimal configurations (37).

Figure 4A:
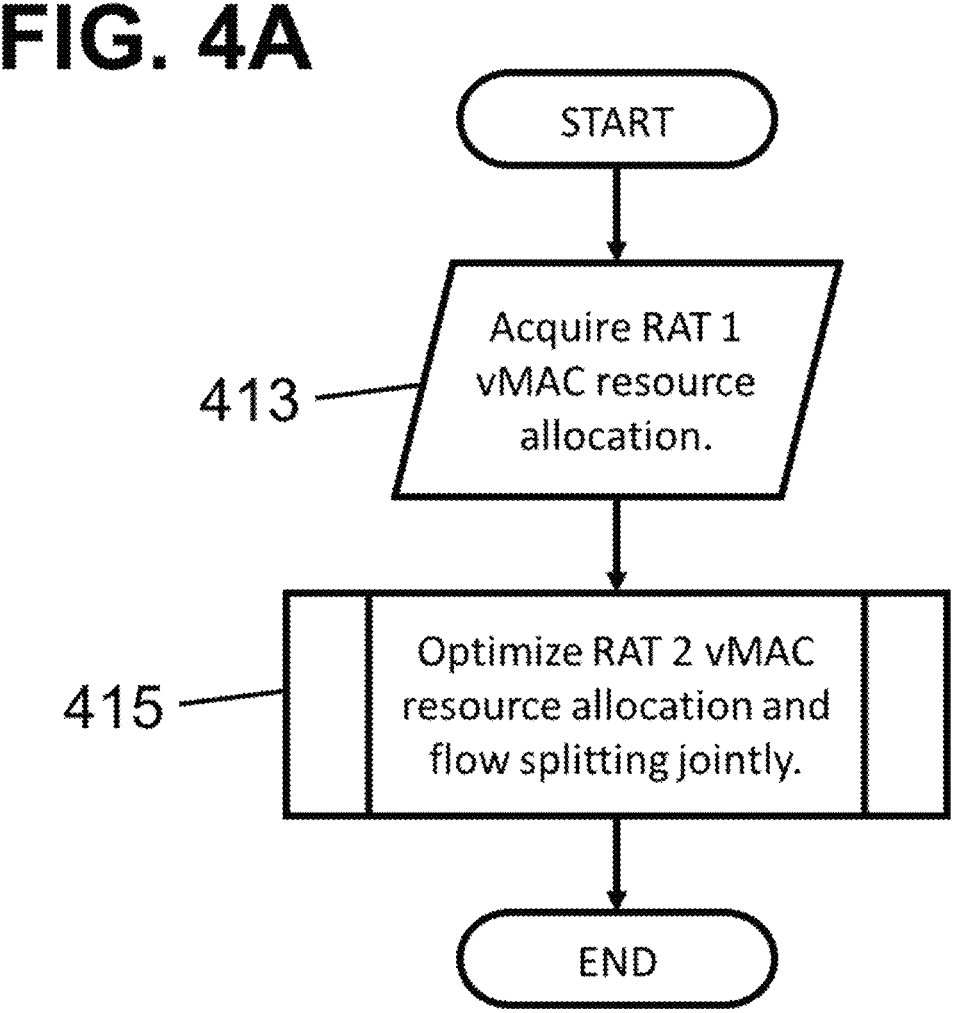
FIG. 4A and FIG. 4B. show two embodiments of the optimization procedure, where
Figure 4B:
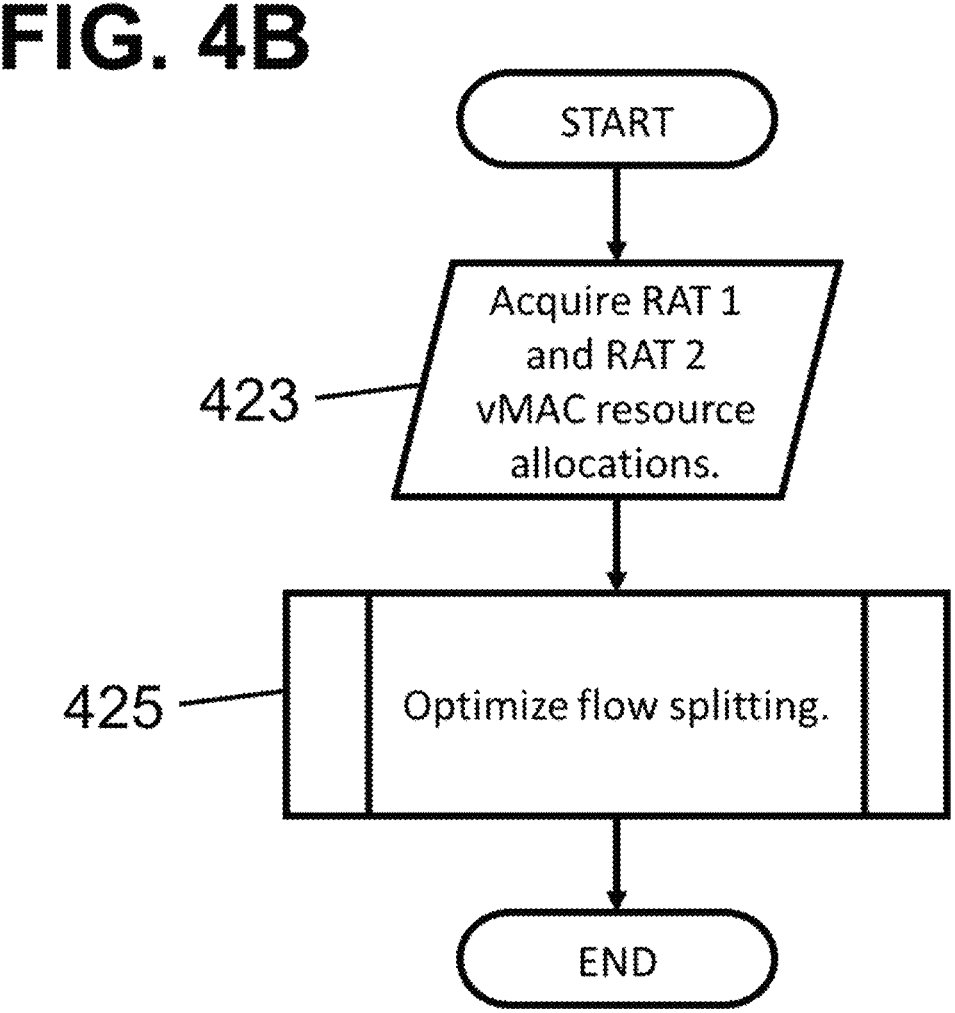

FIG. 4A and FIG. 4B show two embodiments of the box (35) in FIG. 3. In one embodiment, the percentage of wireless resources allocated to each service group at RAT 1 are specified by the service group attributes. This case is illustrated in FIG. 4A, where RAT 1's resource allocation is regarded as constant and not optimized (413). For all service groups, the RAN controller optimizes for RAT 2's vMAC resource allocation/configuration and flow splitting configurations given RAT 1's resource allocation (415). In another embodiment, RAT 2's resource allocation/configuration may be given and RAT 1 may be optimized jointly with flow splitting configuration. In another embodiment, more than two RATs may be aggregated. In that case all other RATs' vMAC resource allocations/configurations and and flow splitting configurations are optimized given RAT 1's vMAC configuration.

FIG. 4B illustrates the case when the resource allocation and/or configuration for both RAT 1's and RAT 2's vMACs are given. In this case, for all service groups, the RAN controller optimizes for flow splitting configurations given RAT 1 and RAT 2's vMAC configurations (425). In another embodiment, more than two RATs may be aggregated. In that case the flow splitting configurations are optimized given specified vMAC resource allocations and/or configurations.

In the preferred embodiment, given vMAC settings, the optimal flow splitting is performed using the expected flow data rates of each service group at each RAT. For a given service group, if a flow is expected to achieve a data rate of r1 and r2 at RAT 1 and RAT 2, respectively, then a fraction r1/(r1+r2) of the flow is directed to RAT 1 and a fraction r2/(r1+r2) of the flow is directed to RAT 2. In an embodiment, the expected rates may be estimated using the RAT's physical bit rates, channel quality feedback from the base stations and/or UEs, the percentage of wireless resources allocated to the vMAC of corresponding service group, etc. In another embodiment, expected data rates may also be estimated using the history of achieved data rates. In another embodiment, the flow splitting may be performed using the queue size history for the flows at the RATs' base stations. In the preferred embodiment, the flow splitting optimization should also take into account the service group attributes. For example, to satisfy the requirements of a service group running a low latency and mission critical application, its flows may be served majorly by the LTE base station, while the non-time-critical flows may be offloaded to a Wi-Fi base station to make room for the time-critical flows.

Figure 5:
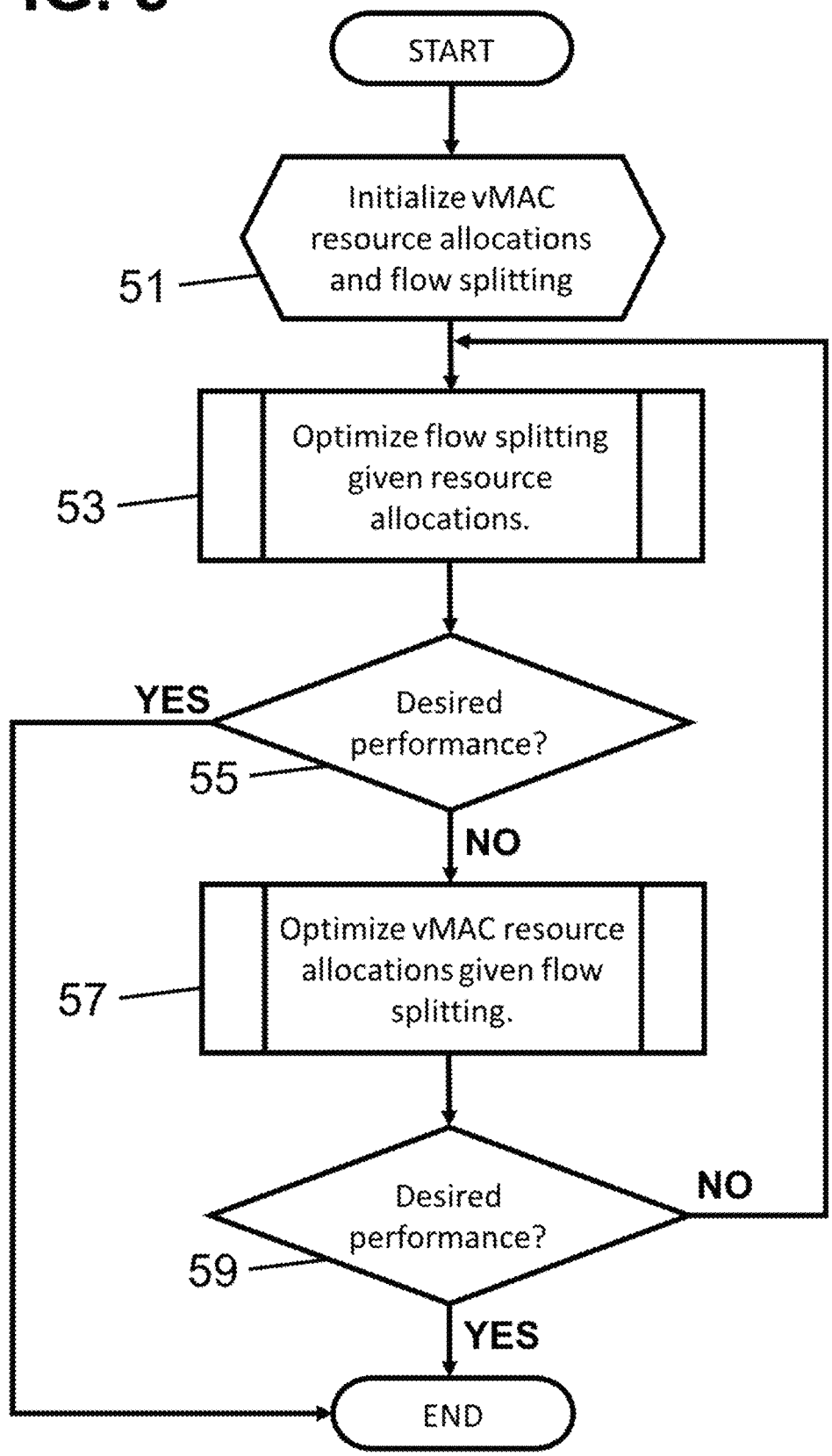
FIG. 5 shows another embodiment of the optimization procedure, where the optimization is performed in an iterative fashion.

In one embodiment of the box (35) in FIG. 3, the optimization of vMACs and flow split configuration are done in an iterative fashion. This is shown in FIG. 5. First the flow splitting configuration is optimized given vMAC resource allocations and then vMAC resource allocations are optimized given flow splitting configuration until a desired performance is achieved or until the iteration converges. The vMAC resource allocations and split configurations are initialized (51). In one embodiment, the initialization is performed randomly. In another embodiment, previously used configuration is used, since the optimization is performed repeatedly. In another embodiment, a previously used configuration is used to make an initial estimate of the optimal parameters. Then until a desired performance is achieved or until the iteration converges (checked at (55) and (59)), first the flow splitting configuration is optimized given vMAC resource allocations (53) and then vMAC resource allocations are optimized given flow splitting configuration (57). The task in (53) can be performed as explained above. The task in (57) can be done using expected data rates at each RAT and service group attributes.

Many of the above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor. By way of example, and not limitation, such non-transitory computer-readable media can include flash memory, RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. The computer readable media does not include carrier waves and electronic signals passing wirelessly or over wired connections.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

CONCLUSION

A system and method has been shown in the above embodiments for the effective implementation of a system and apparatus for programmable virtualization and optimization of aggregated wireless radio access technologies. While various preferred embodiments have been shown and described, it will be understood that there is no intent to limit the invention by such disclosure, but rather, it is intended to cover all modifications falling within the spirit and scope of the invention, as defined in the appended claims.

The invention claimed is:

1. A system for programmable virtualization and joint optimization of wireless link aggregation in a wireless network comprising:
   a plurality of user equipment (UEs), each UE having a plurality of unique radio access technologies (RAT) interfaces, each unique RAT interface associated with a unique RAT technology and each unique RAT interface served by a corresponding RAT base station (RAT BS), said plurality of UEs being part of one or more service groups, each service group having a set of different service characteristics;
   a radio access network (RAN) controller performing network virtualization by invoking, configuring, and controlling parameters of a virtual Medium Access Control (vMAC) for each service group at all RAT BSs, each vMAC allocated to serve one service group;
   wherein for each service group, the RAN controller performs joint optimization of vMAC configurations across all RAT BSs for wireless resources allocated to each vMAC and determining data flow splitting between the plurality of RAT interfaces of each UE within each service group, and
   wherein the number of unique RAT interfaces is greater than or equal to two, and wherein a first base station (IBS) is associated with the first RAT interface, the IBS: (a) receiving incoming traffic, (b) splitting incoming traffic into n flows, and (c) forwarding (n−1) flows to remaining (n−1) RAT BSs, and wherein received n flows from n RAT BSs are merged into one flow at the UE.

2. The system of claim 1, wherein the RAN controller also periodically collects information from both BSs and UEs in order to be able to perform the joint optimization, the periodically collected information comprising any of, or a combination of, the following: link quality, signal strength/quality indicator, instantaneous traffic loads, instantaneous traffic rates.

3. The system of claim 1, wherein the RAN controller also periodically collects information from both BSs and UEs in order to be able to perform the joint optimization, the periodically collected information comprising any of, or a combination of, the following: link quality, signal strength/quality indicator, instantaneous traffic loads, instantaneous traffic rates.

4. The system of claim 3, wherein using service group attributes and periodically collected information from BSs and UEs, the RAN controller performs joint optimization for the following: (a) optimal resource allocation for each service group in a first RAT interface, (b) optimal resource allocation and/or other vMAC properties for each service group in a second RAT interface, and (c) optimal way of splitting data between the first RAT interface and the second RAT interface.

5. The system of claim 4, wherein the service group attributes comprises any of the following: priority, equipment capabilities, assigned users to service groups, used user scheduling algorithms, admission control policy, QoS requirements, and used RAN control algorithms.

6. The system of claim 4, wherein the periodically collected information from BSs and UEs comprises any of the following: link qualities, signal strengths, instantaneous/expected loads, and instantaneous/expected flow rates.

7. The system of claim 3, wherein a percentage of wireless resources allocated to each service group at a given RAT interface is specified by the service group attributes.

8. The system of claim 6, wherein data flow splitting is performed using the instantaneous/expected flow data rates of each service group at each RAT.

9. The system of claim 8, wherein when a flow is expected to achieve a data rate of r1 and r2 at the first RAT interface and the second RAT interface, respectively, then a first fraction r1/(r1+r2) of the flow is directed to the first RAT interface and a second fraction r2/(r1+r2) of the flow is directed to the second RAT interface.

10. The system of claim 8, wherein the expected flow data rates are estimated via any of the following: a RAT's physical bit rates, channel quality feedback from the base stations and/or UEs, and a percentage of wireless resources allocated to a vMAC of corresponding service group.

11. The system of claim 8, wherein the expected flow data rates are estimated via a history of achieved data rates.

12. The system of claim 1, wherein data flow splitting is performed using a queue size history for flows at a given RAT interface's base stations.

13. The system of claim 1, wherein the joint optimization of vMAC configurations and data flow splitting between RAT interfaces is done in an iterative manner.

* * * * *